United States Patent
Hiranandani et al.

(10) Patent No.: US 11,443,389 B2
(45) Date of Patent: Sep. 13, 2022

(54) DETERMINATION OF PAYWALL METRICS

(71) Applicant: Adobe Inc., San Jose, CA (US)

(72) Inventors: Gaurush Hiranandani, Bengaluru (IN); Tanya Goyal, Mumbai (IN); Sumit Shekhar, Bangalore (IN); Payal Bajaj, Bangalore (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/001,984

(22) Filed: Aug. 25, 2020

(65) Prior Publication Data

US 2020/0387979 A1 Dec. 10, 2020

Related U.S. Application Data

(62) Division of application No. 15/277,136, filed on Sep. 27, 2016, now Pat. No. 10,853,887.

(51) Int. Cl.
*G06Q 40/00* (2012.01)
*G06Q 20/02* (2012.01)
*G06Q 20/12* (2012.01)
*G06Q 20/40* (2012.01)

(52) U.S. Cl.
CPC .......... *G06Q 40/12* (2013.12); *G06Q 20/027* (2013.01); *G06Q 20/123* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 9,396,232 | B1 * | 7/2016 | Kapoor | G06F 16/24564 |
| 9,405,799 | B1 * | 8/2016 | Kapoor | G06Q 10/1057 |
| 9,454,576 | B1 * | 9/2016 | Kapoor | G06Q 10/105 |
| 9,454,577 | B1 * | 9/2016 | Kapoor | G06F 16/24564 |
| 9,659,062 | B1 * | 5/2017 | Kapoor | G06F 16/24564 |
| 10,635,985 | B2 * | 4/2020 | Gauthier | G06Q 10/0637 |
| 10,853,887 | B2 | 12/2020 | Hiranandani et al. | |
| 10,873,772 | B2 * | 12/2020 | Rossato | H04N 21/440281 |
| 11,080,336 | B2 * | 8/2021 | Van Dusen | G06Q 50/01 |
| 2003/0050816 | A1 * | 3/2003 | Givens | G06Q 10/063112 705/7.14 |
| 2004/0204868 | A1 * | 10/2004 | Maynard | G01N 21/49 702/30 |
| 2007/0143851 | A1 * | 6/2007 | Nicodemus | G06F 21/577 726/4 |
| 2008/0140576 | A1 * | 6/2008 | Lewis | G06Q 20/4016 707/999.107 |

(Continued)

OTHER PUBLICATIONS

"Final Office Action", U.S. Appl. No. 15/277,136, filed Oct. 4, 2019, 10 pages.

(Continued)

*Primary Examiner* — Fateh M Obaid
(74) *Attorney, Agent, or Firm* — FIG. 1 Patents (57) ABSTRACT

Techniques and systems for determining paywall metrics are described. In an implementation, a candidate paywall metric is created that corresponds to an increased propensity of users to engage in a paid transaction when exposed to a paywall. In this way, providers of digital content may increase the proportion of users that perform a transaction when exposed to the paywall.

20 Claims, 8 Drawing Sheets

(56) References Cited

U.S. PATENT DOCUMENTS

| | | | | |
|---|---|---|---|---|
| 2008/0154820 | A1* | 6/2008 | Kirshenbaum | G06N 3/126 706/20 |
| 2009/0271751 | A1* | 10/2009 | Fatemi | G01R 31/318371 716/113 |
| 2011/0187596 | A1* | 8/2011 | Rao | G06F 11/10 342/357.66 |
| 2012/0069131 | A1* | 3/2012 | Abelow | G06Q 30/02 345/589 |
| 2012/0312918 | A1* | 12/2012 | Heppe | B64B 1/00 244/30 |
| 2013/0028573 | A1* | 1/2013 | Hoofien | G06Q 30/0241 386/248 |
| 2014/0195398 | A1* | 7/2014 | Rose | G06Q 40/06 705/35 |
| 2014/0280952 | A1* | 9/2014 | Shear | H04L 47/70 709/226 |
| 2014/0282586 | A1* | 9/2014 | Shear | G06Q 10/0631 718/104 |
| 2014/0310036 | A1* | 10/2014 | Grosso | G06Q 30/0201 705/7.11 |
| 2015/0073889 | A1* | 3/2015 | Griffiths | G06Q 30/0224 705/14.25 |
| 2015/0120466 | A1* | 4/2015 | Redlich | G06Q 30/0273 705/14.69 |
| 2016/0232548 | A1* | 8/2016 | Grosso | G06N 20/00 |
| 2016/0350796 | A1* | 12/2016 | Arsenault | G06Q 30/0242 |
| 2018/0089652 | A1 | 3/2018 | Hiranandani et al. | |
| 2020/0311747 | A1* | 10/2020 | Ouyang | G06N 5/04 |
| 2020/0321124 | A1* | 10/2020 | Ford | G06K 9/6265 |
| 2020/0387979 | A1* | 12/2020 | Hiranandani | G06Q 20/027 |

OTHER PUBLICATIONS

"Final Office Action", U.S. Appl. No. 15/277,136, filed Apr. 15, 2020, 7 pages.

"FirstAction Interview Office Action", U.S. Appl. No. 15/277,136, filed Nov. 19, 2019, 7 pages.

"Freemium—Wikipedia", Retrieved at: https://en.wikipedia.org/wiki/Freemium—on Jun. 7, 2016, 3 pages.

"Non-Final Office Action", U.S. Appl. No. 15/277,136, filed Apr. 5, 2019, 10 pages.

"Notice of Allowance", U.S. Appl. No. 15/277,136, filed Jul. 21, 2020, 7 pages.

"Paywall—Wikipedia", Retrieved at: https://en.wikipedia.org/wiki/Paywall—on Jun. 7, 2016, 9 pages.

"Pre-Interview First Office Action", U.S. Appl. No. 15/277,136, filed May 15, 2019, 6 pages.

"Restriction Requirement", U.S. Appl. No. 15/277,136, filed Jan. 11, 2019, 6 pages.

"The 2015 Ad Blocking Report", Retrieved at: https://pagefair.com/blog/2015/ad-blocking-report/, Aug. 10, 2015, 6 pages.

Balachandran, Athula et al., "Developing a Predictive Model of Quality of Experience for Internet Video", SIGCOMM, 2013, Aug. 2013, 12 pages.

Goyanes, Manuel, "The Value of Proximity: Examining the Willingness to Pay for Online Local News", International Journal of Communication 9(2015), Oct. 18, 2014, pp. 1505-1522.

Kohavi, Ron et al., "Online Controlled Experiments and A/B Tests", Apr. 25, 2015, 11 pages.

Lambrecht, Anja et al., "Pricing Online Content: Fee or Free?*", May 7, 2014, 62 pages.

Pai, Sajth, "Ad blockers, unusual publishers, and other 2015 tech highlights that are key to 2016", Retrieved at: http://www.inma.org/blogs/blogPrint.cfm?blog=techTrends&id=82B66CFF-F241-56EC-CEA49A61F55188D9, Dec. 28, 2015, 4 pages.

Rosenwald, Michael, "The digital media industry needs to react to ad blockers . . . or else", Retrieved at: http://www.cjr.org/business_of_news/will_ad_blockers_kill_the_digital_media_industry.php—on Jun. 7, 2016, Sep. 2015, 4 pages.

* cited by examiner

DETERMINATION OF PAYWALL METRICS

RELATED APPLICATION

This application is a divisional of and claims priority to U.S. patent application Ser. No. 15/277,136, filed Sep. 27, 2016, the disclosure of which is incorporated by reference herein in its entirety.

BACKGROUND

Paywalls are systems implemented to restrict access to digital content that is available online A paywall is typically implemented by a computing device through use of a user interface. The user interface is presented to users of an online environment by the computing device upon reaching a threshold amount of interaction (e.g., a paywall metric) with digital content provided by an online service provider system. Such metrics may include a predetermined number of articles, videos, songs, digital images, and so forth. When the threshold amount of interaction is reached, the computing device restricts the user's access to the digital content and the user interface of the paywall is displayed. The user interface is configured to inform the user that the threshold has been reached and includes information explaining how access to additional digital content may be achieved, e.g., purchase of a subscription. Accordingly, the computing devices uses the paywall to require the user to conduct some kind of transaction, via the user interface, in order to achieve this additional access.

Access may be achieved in a variety of ways, such as giving the user a choice to purchase the single item of digital content that the user was attempting to view when the paywall user interface was presented, purchase a subscription to the entire online environment (e.g., a website or application that is serving the digital content), purchase credits to access an additional number of items, and so forth. For example, an online news portal might allow a user to read six free articles in a month before asking the user to either purchase the seventh article or pay for a subscription that gives access to the entire portal.

Conventional techniques used by a computing device to determine when to display the user interface of the paywall, however, are static. For example, conventional techniques used to control output of the user interface of the paywall are set based on a "best guess" of a user that will promote subsequent purchases. As such, these conventional techniques do not allow service provider systems to meaningfully compare users' behavior over a large number of options (e.g., different metrics or different values of the same metric). In part, this is because paywall design is not driven or supported by robust statistical data analysis. For example, some conventional techniques allow online service provider systems to adjust the paywall metric that initiates presentation of the paywall user interface, which is manually input as a "best guess" by the service provider system. Thus, these techniques only allow service provider systems to understand how their paywall is performing with respect to the number of transactions it generates.

SUMMARY

Techniques and systems for determining paywall metrics are described. In an implementation, a computing system determines a candidate paywall metric that corresponds to an increased propensity of users to engage in a paid transaction when exposed to a paywall. The candidate paywall metric advantageously enables service provider systems to compare multiple potential paywall metrics, and values of these metrics, to determine which values of potential metrics affect the behavior of users to perform a transaction to gain access to additional digital content (e.g., to purchase or not purchase a subscription). The techniques and systems described herein collect data about various ways in which users interact with service provider systems and analyze the causal relationships, if any, between the interactions and users' propensity to perform the transaction that provides access to additional digital content. A likelihood that a user will engage in such transaction can be determined for different values of each potential metric. By comparing the likelihood associated with each potential candidate with the likelihood associated with a current paywall metric, service provider systems that provide digital content may determine a paywall metric likely to increase the proportion of users that perform a transaction when exposed to the paywall.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Traditional online service provider systems face decreasing revenue from digital advertising, largely because of the availability of effective ad-blocking technology. One common tool that service provider systems use to address this lost revenue is a paywall. The service provider system typically first selects a limit to the amount of digital content that users can access for free. The limit for a news website, for instance, is typically based on a number of articles that can be accessed during a time period. When a user reaches the limit, additional access is blocked by the service provider system and the user is presented with a user interface that offers the user the option to perform various transactions to obtain additional access, such as purchasing an article or purchasing a subscription to the online environment.

Techniques and systems are described to determine a paywall metric that can increase the proportion of users that perform a transaction to gain additional access to an online digital media environment after being exposed to the paywall. A paywall metric defines a condition that, when satisfied, causes the paywall user interface to be presented that is used to control further access to the digital content. In one example, the system measures metric values of metrics that describe user interactions with an online digital media environment at the point at which the user is exposed to a paywall. A test is then applied to the data by the system, such as a uni-variate test that is usable to determine differences between the probability distributions of data sets (an example of which is a Kolmogorov-Smirnov Test). The system uses these differences between the probability distributions to determine which metrics behave differently for the set of users that did not perform a transaction versus the set of users that did perform a transaction. Based on this determination, the system then uses the metrics that have exhibited significant differences in behavior as possible candidates for use as a paywall metric to control use of the paywall. The metrics that exhibit this difference in behavior are called discriminatory metrics.

The discriminatory metrics are used to determine a candidate paywall metric that may be used to condition presentation of the paywall as described below. To do so, the system applies another technique to determine a difference (e.g., a maximum difference) between the propensity for users to perform a transaction and the propensity for users to not perform a transaction. This technique is used to generate, for each metric, a transaction data set containing the metric value of the metric for every interaction that resulted in a transaction and a non-transaction data set containing the metric value of the metric for every interaction that did not result in a transaction. The system then uses a statistical algorithm to determine a difference value, for each metric, between a probability that a metric value is in the transaction data set and a probability that the metric value is in the non-transaction data set. The system then ranks the difference values from largest to smallest (excluding values for which the probability that the metric value is in the non-transaction data set is higher than the probability that the metric value is in the transaction data set. The metric-value combination for which the difference value is largest is determined to be the candidate paywall metric. For example, if four discriminatory metrics are determined (i.e., four metric-value pairs exhibit the statistically significant difference described above), then the system determines which of the four corresponds to the greatest difference value. This is the value of the candidate paywall metric.

As previously described, the online environment has a current paywall metric that is used to present the paywall. The system compares the propensity for users to perform a transaction and the propensity for users to not perform a transaction when exposed to the paywall at the current paywall metric those propensities at the candidate paywall metric. If the propensity to perform a transaction is higher for the candidate paywall metric, the system controls the subsequent presentation of the paywall, during subsequent user interactions with the digital media environment, by replacing the current paywall metric with the candidate paywall metric.

These techniques provide a way for the system to identify a paywall metric that online service provider systems can use to condition presentation of paywalls. The techniques also identify other metrics for which the behavior of users who perform a transaction upon exposure to the paywall and behavior of users who do not perform a transaction are significantly different. As described in more detail below, the other metrics can be useful to service provider systems in designing features and digital content for the online environment.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
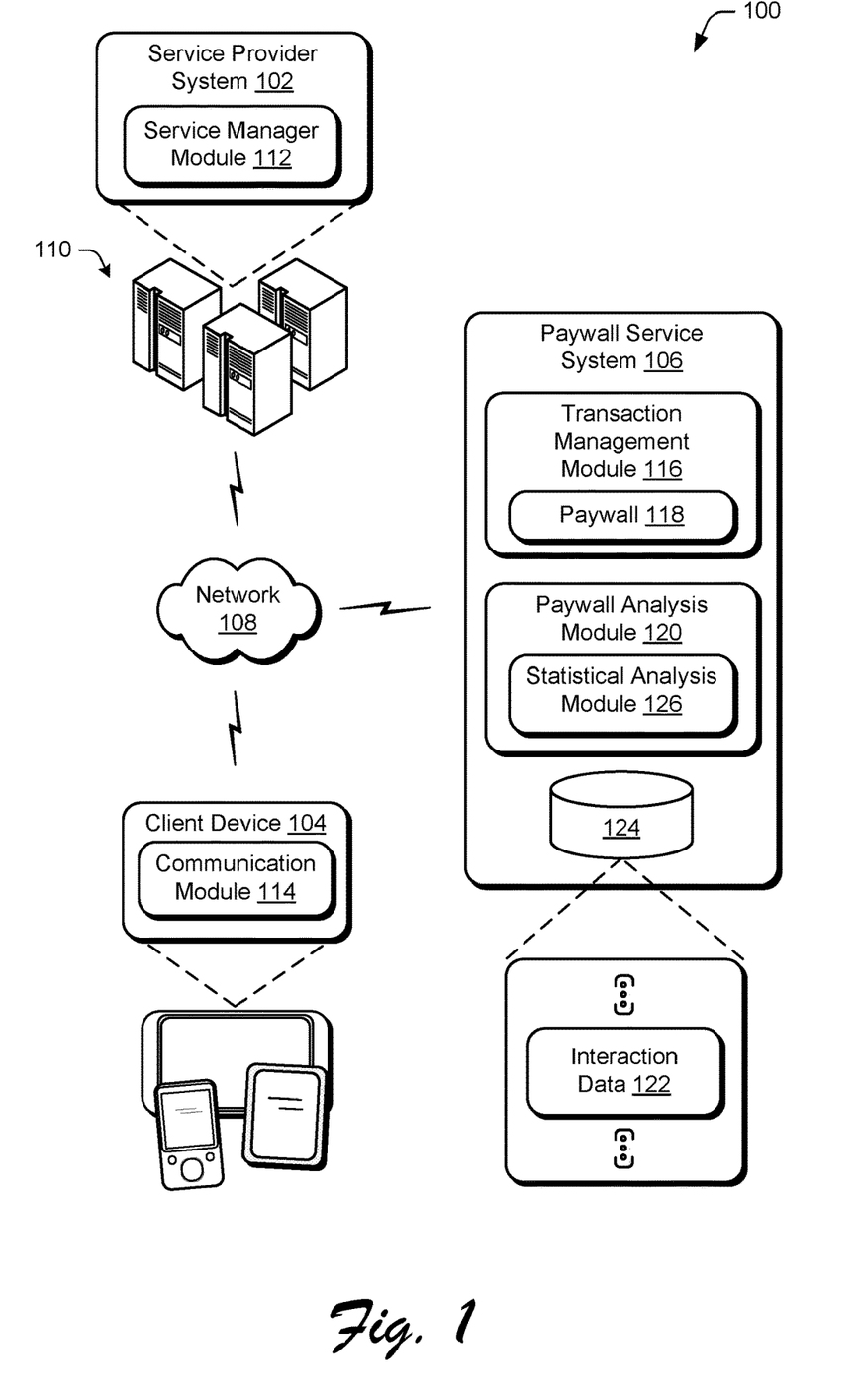
FIG. 1 is an illustration of an environment in an example implementation that is operable to employ paywall metric techniques described herein.

FIG. 1 is an illustration of a digital medium environment 100 in an example implementation that is operable to employ paywall metric techniques described herein. The illustrated environment 100 includes a service provider system 102, a client device 104, and a paywall service system 106 that are communicatively coupled, one to another, via a network 108. These entities may be implemented by computing devices that are configured in a variety of ways.

A computing device, for instance, implementing the client device 104 may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, the computing device may be representative of a plurality of different devices, such as multiple servers 110 utilized by a business to perform operations "over the cloud" as illustrated for the service provider system 102 and further described in relation to FIG. 8.

The service provider system 102 is illustrated as including a service manager module 112 that is representative of functionality implemented at least partially in hardware of a computing device to provide services (e.g., web services) accessible via the network 108 that are usable to make digital content (e.g., products or services) available to consumers, e.g., through interaction with the client device 104. The service manager module 112, for instance, may expose a website or other digital content functionality that is accessible via the network 108 by a communication module 114 of the client device 104. The communication module 114 may be configured as a browser, a network-enabled application, and so on that obtains data from the service provider system 102 via the network 108. This data is employed by the communication module 114 to enable a user of the client device 104 to communicate with the service provider system 102 to access services involving digital content of the service provider system 102, e.g., news articles, music, and so forth.

In order to control access to the digital content, the service provider system 102 may employ a paywall service system 106. Although functionality of the paywall service system 106 is illustrated as separate from the service provider system 102, this functionality may also be incorporated as part of the service provider system 102, further divided among other entities, and so forth. The paywall service system 106 includes a transaction management module 116, implemented at least partially in hardware of a computing device, that is representative of functionality to control access to the digital content provided by the service provider system 102 and enable users to purchase and consume the digital content. In order to do so, the transaction management module 116 includes a paywall 118 implemented as a module of a computing device of the paywall service system 106. The paywall 118 employs a user interface that is presented to users of the client device 104 upon reaching a threshold amount of interaction with the service provider system 102. For example, the paywall 118 may present a user interface, such as a "pop up" window, that notifies the user the threshold has been reached and offers the user options to engage in a transaction to access additional digital content (e.g., purchase a subscription).

The paywall service system 106 is further illustrated as including a paywall analysis module 120. The paywall analysis module 120 is implemented at least partially in hardware of a computing device to monitor, measure, and analyze metrics that describe user interactions with the digital content of the service provider system 102. The user interactions may include any interaction with the digital content of the service provider system 102 that can be counted. Examples of countable metrics include a time of day the interaction occurred, a time duration of the interaction, a day of the week the interaction occurred, a referral source that directed the user to the digital content of the interaction, a device type on which the interaction occurred, an amount of digital content with which the interaction occurred, a genre of the digital content with which the interaction occurred, a number of times the user interacted with the environment in a time period, a number of articles read in a time period, a sum (in words or pages) of a length of all articles read in a time period, and so forth.

The paywall analysis module 120 is configured to measure a metric value of metrics involving interaction with the paywall 118 (i.e. at the current paywall metric). The measured metric values are stored as interaction data 122 in storage 124 of computing devices associated with the paywall service system 106. The interaction data 122, for instance, includes the measured metric value of each metric, for each user, associated at a point in time that the user is exposed to the paywall 118.

Users that interact with the service provider system 102 can be sorted into a variety of groups. In a first such example, a first group includes users that engaged in a transaction (e.g., purchased a subscription) prior to being exposed to the paywall 118. A second group may be formed to include users that abandoned interaction with the service provider system 102 prior to being exposed to the paywall 118. A third group includes users that engaged in a transaction when exposed to the paywall 118. A fourth group includes users that reached the threshold amount of interaction, and were therefore exposed to the paywall 118, but did not engage in a transaction. In the above examples, the users in the first two groups are not exposed to the paywall 118. Accordingly, in order to promote efficient use of computational resources, the paywall analysis module 120 excludes the data for those users from the interaction data 122.

Part of the functionality usable to monitor and analyze the interaction data 122 is represented as a statistical analysis module 126. The statistical analysis module 126 is implemented at least partially in hardware of at least one computing device to determine a paywall metric to control presentation of the paywall 118, e.g., to increase paid transactions. To do so, the statistical analysis module 126 analyzes the interaction data 122. For instance, the statistical analysis module 126 may determine which of the metrics behave differently for user interactions that result in a transaction with the paywall 118 with respect to user interactions that do not result in a transaction. The statistical analysis module 126 may also determine, for each metric value of each metric, the propensity of users to complete a transaction to enable additional access to the digital content of service provider system 102.

Using these propensities, the statistical analysis module 126 determines the metric value of the metric that provides the highest probability that users will engage in a transaction when presented with the paywall 118. In this way, the statistical analysis module 126 can create an alternate paywall metric candidate that the transaction management module 116 may use to control subsequent exposure of the paywall 118. The statistical analysis module 126 may also provide a notification of all of the metrics for which behavior of users differed. This information can be used to help manage the digital content of the service provider system 102. Further discussion of operation of the statistical analysis module 126 is described in the following and shown in a corresponding figure.

Figure 2:
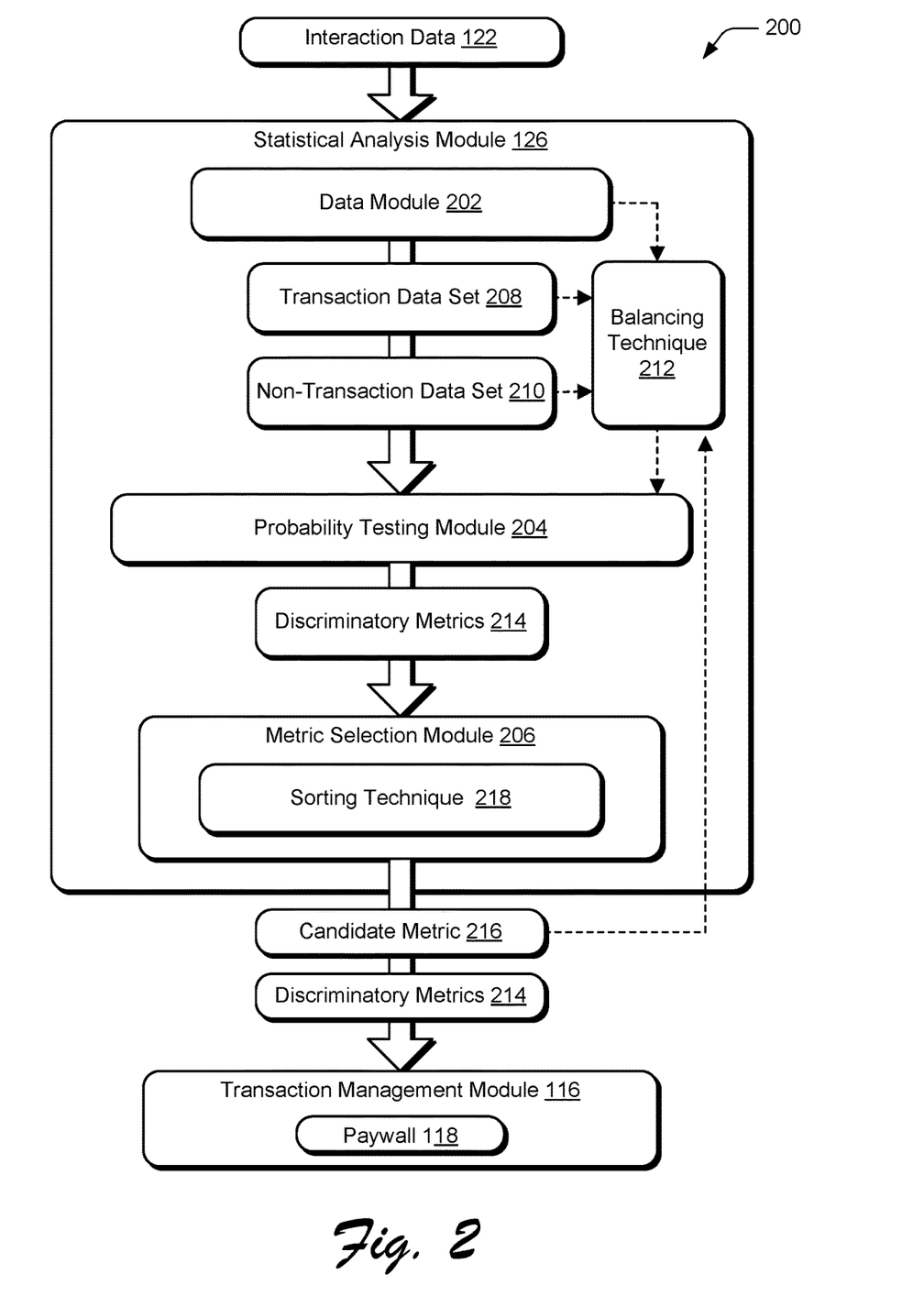
FIG. 2 depicts a system in an example implementation showing the paywall metric techniques in greater detail.

FIG. 2 depicts a system 200 in an example implementation showing the statistical analysis module 126 in greater detail. The statistical analysis module 126 includes a data module 202, a probability testing module 204, and a metric selection module 206 that are implemented at least partially in hardware of at least one computing device. The data module 202 is representative of functionality to sort the interaction data 122 according to whether a particular user interaction corresponds to a transaction when the user is exposed to the paywall 118 at the current paywall metric. The data module 202 generates, for each metric, a transaction data set 208 and a non-transaction data set 210. The transaction data set 208 includes, for each user interaction that resulted in a transaction after being exposed to the paywall 118, the measured metric value of the metric upon exposure to the paywall 118. The non-transaction data set 210 includes, for each user interaction that did not result in a transaction after being exposed to the paywall 118, the measured metric value of the metric upon exposure to the paywall 118.

The data module 202 also measures the difference between the number of metric values in the transaction data set 208 and the number of metric values in the non-transaction data set 210. When the difference exceeds a threshold, the data module 202 applies a balancing technique 212. For example, the balancing technique 212 may be configured by the module to extract a representative subset from the larger data set, using conventional methods. The representative subset is then used in place of the larger data set to perform the remainder of the process described herein to create a candidate paywall metric. The balancing technique 212 is used to repeat the extraction and replacement procedure a number of times (e.g., 100 times). The most common result produced by the repetitions is then used as the candidate paywall metric. In other cases, the balancing technique 212 is configured to extract the representative subset from the larger data set and the representative subset is used in place of the larger subset. An example implementation of operation of the data module 202 is described in the following and shown in a corresponding figure.

Figure 3:
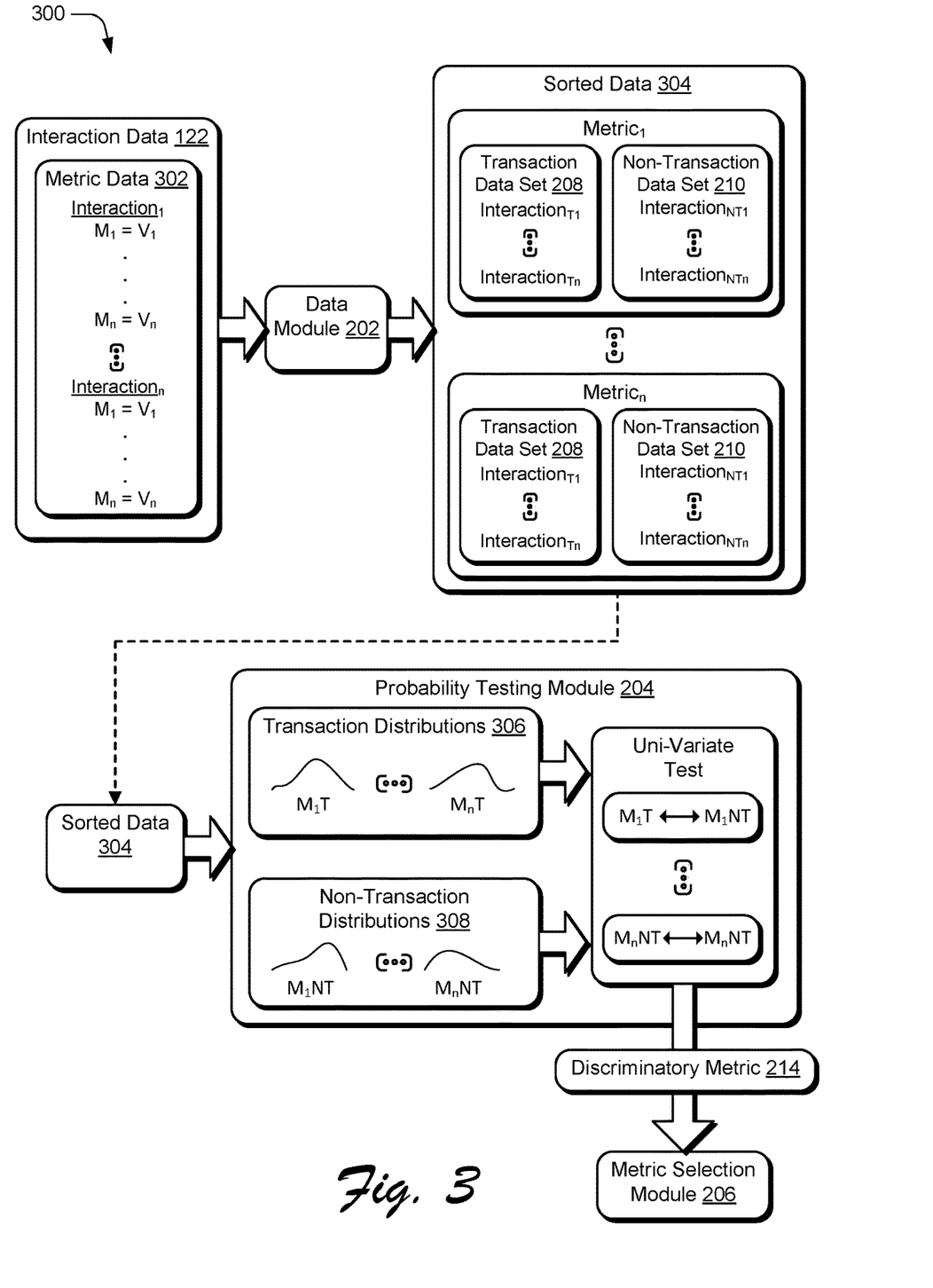
FIG. 3 depicts a system in another example implementation showing the paywall metric techniques in greater detail.

FIG. 3 depicts a system 300 in an example implementation showing operation of the data module 202 in greater detail. The data module 202 is illustrated as receiving the interaction data 122. As shown on FIG. 3, the interaction data 122 includes metric data 302. The metric data 302 comprises, for each user interaction (Interaction$_1$-Interaction$_n$), the measured metric value (V$_1$-V$_n$) of each metric, measured at the point in time that the user is exposed to the paywall 118. The data module 202 sorts the interaction data 122 according to whether the interaction corresponds to a transaction. The result of the sorting is illustrated on FIG. 3 as sorted data 304.

For example, the transaction data set 208 and the non-transaction data set 210 for Metric$_1$ are illustrated as including interactions T$_1$ through T$_n$ and NT$_1$ through NT$_n$, respectively. The sorted data 304 for Metric$_1$ thus separates all of the user interactions into those that resulted in a transaction, transaction data set 208 and those that did not result in a transaction, non-transaction data set 210. Similarly, for the remaining metrics, the data module 202 provides the transaction data set 208 and the non-transaction data set 210.

Returning to FIG. 2, the transaction data set 208 and the non-transaction data set 210 for each metric are obtained by the probability testing module 204. The probability testing module 204 is representative of functionality to analyze the sorted interaction data 122 (i.e., the transaction data sets 208 and the non-transaction data sets 210, for each metric). The probability testing module 204 determines the metrics that behave differently for user interactions that resulted in a transaction with the paywall 118 with respect to user interactions that did not result in a transaction. The metrics that behave differently are those for which there is a difference between a probability that a metric value of a metric is contained within the transaction data set 208 and a probability that the metric value is contained within the non-transaction data set 210.

The probability testing module 204 applies a test to the data to determine that there is a difference between the probability that a metric value of a metric is contained within the transaction data set 208 and a probability that the metric value is contained within the non-transaction data set 210. The test may be configured as a uni-variate test to determine when there is a difference between the probability distributions for the transaction data set 208 and the non-transaction data set 210. For instance, the probability testing module 204 may determine a Kolmogorov-Smirnov (KS) Statistic for each data set. The probability testing module 204 can then use the KS Statistic to determine whether, for a particular metric, the probability distribution for the metric values of the metric in the transaction data set 208 is different from the probability distribution for the metric values of the same metric in the non-transaction data set 210.

The following describes an example of mathematics that may be employed by the probability testing module 204. Consider example metrics that are present in both the transaction data set 208 and the non-transaction data set 210. For each metric M, the KS Statistic is written as KS(M). Then, $$KS(M) = \sup_X |F_T(x) - F_{NT}(x)|$$

where $F_T(x)$ and $F_{NT}(x)$ are the empirical distribution functions of the metric values of M for the transaction data set 208 and the non-transaction data set 210, respectively and (x) takes all possible metric values of M. The term "sup$_X$" is the supremum of the set of differences, $|F_T(x) - F_{NT}(x)|$.

The supremum of a subset of a (partially ordered) set is the least element in the set that is greater than or equal to all elements of the subset.

In this example, the null hypothesis is that the distribution of a metric M is the same for the transaction data set 208 and the non-transaction data set 210. The null hypothesis is rejected if:

$$KS(M) > C(\alpha) \sqrt{\frac{n_T + n_{NT}}{n_T n_{NT}}}$$

Where $\alpha$ is the significance level (the maximum probability of erroneously rejecting the null hypothesis), $C(\alpha)$ is the critical value at a particular significance level, and $n_T$ and $n_{NT}$ are the number of metric values in the transaction data set 208 and the non-transaction data set 210, respectively. The critical value, $C(\alpha)$, is given below for some values of ($\alpha$).

| $\alpha$ | 0.10 | 0.05 | 0.025 | 0.01 | 0.005 | 0.001 |
|---|---|---|---|---|---|---|
| $C(\alpha)$ | 1.22 | 1.36 | 1.48 | 1.63 | 1.73 | 1.95 |

The probability testing module 204 then determines KS(M) and the p-value of the KS Statistic. The p-value is a measure of the statistical significance of the test results, which can be determined with conventional methods or interpolated from tables of critical values known in the art with significant p-values. Continuing the example, the probability testing module 204 rejects the null hypothesis at $\alpha=0.01$ if:

$$KS(M) > 1.63 \sqrt{\frac{n_T + n_{NT}}{n_T n_{NT}}}$$

and the p-value of the test is less than a predefined value. Different p-values can be used (e.g., 0.01, 0.05 or 0.10), which provide different levels of confidence regarding the determination that the metrics behave differently. Smaller p-values provide a higher statistical likelihood that the metrics behave differently.

The metric values of each metric M for which the null hypothesis is rejected are metric values of discriminatory metrics 214. These are the metrics that behave differently. In other words, for the discriminatory metrics 214 there is a statistically significant difference between the probability of being contained in the transaction data set 208 and the probability of being contained in the non-transaction data set 210. An example implementation of operation of the probability testing module 204 is described in the following and shown in a corresponding figure.

Turning again to FIG. 3, the system 300 shows operation of the probability testing module 204 in greater detail. As shown on FIG. 3, the data module 204 receives the sorted data 304, which includes the transaction data set 208 and the non-transaction data set 210, for each metric. The probability testing module 204 is configured to determine which metrics behave differently for user interactions that resulted in a transaction with the paywall 118 with respect to user interactions that did not result in a transaction.

To determine the differently behaving metrics, the probability testing module uses a probability distribution for each metric (1 through n) in the transaction data set 208 and the non-transaction data set 210. The probability distributions for the transaction data sets 208 are illustrated on FIG. 3 as transaction distributions 306 ($M_1T$-$M_nT$). The probability distributions for the non-transaction data sets 210 are illustrated on FIG. 3 as transaction distributions 308 ($M_1NT$-$M_nNT$).

The probability module 204 is also configured to apply a uni-variate test to the distributions to determine the metrics for which there is a difference between the probability distributions of the metric values in the transaction data set 208 and the metric values in the non-transaction data set 210. For example, the uni-variate test determines, for each metric, whether there is a difference between the probability between the transaction distribution 306 and the non-transaction distribution 308.

Consider an example metric, $M_1$, as illustrated on FIG. 3. The transaction distribution 306 is $M_1T$ and the non-transaction distribution 308 is $M_1NT$. By applying the uni-variate test to the distributions $M_1T$ and MINT, the probability testing module 204 can determine whether the probability distributions are different. By applying this test, a difference value can be determined between a probability that a metric value of a metric is contained within the transaction data set 208 and a probability that the metric value is contained within the non-transaction data set 210. The test is applied for each metric and the metrics for which this difference value is determined are the discriminatory metrics 214.

Returning again to FIG. 2, the discriminatory metrics 214 are then obtained by the metric selection module 206. The metric selection module 206 is representative of functionality of a computing device to determine the metric value of a discriminatory metric 214 for which the propensity of a user to perform a transaction with the paywall 118 is increased with respect to the current paywall metric. To do so, the metric selection module 206 first ranks, for each metric value of each discriminatory metric 214, the probability differences from largest to smallest. Metric values for which the probability that the metric value is in the non-transaction data set 210 is greater than the probability that the metric value is in the transaction data set 208 are excluded. Then, using the ranked difference values, the metric selection module 206 creates a candidate metric 216 that corresponds to an increased propensity for users to perform the transaction with the paywall 118. The candidate metric 216 is the discriminatory metric 214 having the largest difference value between the probability of being in the transaction data set and the probability of being in the non-transaction data set.

The metric selection module 206 then employs a sorting technique 218 to rank the probability differences in the discriminatory metrics 214. The sorting technique 218 is used to first determine, for the measured metric values of each discriminatory metric 214, a difference between the probability that a user performed a transaction with the paywall 118 and the probability that the user did not perform a transaction. All results are discarded for which the probability that the user did not perform a transaction is greater than the probability the user performed a transaction. The sorting technique 218 then ranks the remaining metric values from largest to smallest.

The following describes an example of the mathematics that may be employed by the sorting technique 218. Consider an objective function that maximizes the difference between the probability of the user performing a transaction and the probability of the user not performing a transaction over all of the discriminatory metrics 214 (i.e. over all the metrics stored as interaction data 122 and all the possible metric values that they have taken in the data). In some cases, the sorting technique 218 may filter the discriminatory metrics 214 to only apply the objective function to metrics for which a threshold number of data points exist in the interaction data 122 (e.g., 500 data points) in order to increase the reliability of the results.

Continuing the example, the objective function may take the form:

$$O(M) = P(U \in T) - P(U \in NT)$$

where $O(M)$ is the objective function, and M is any discriminatory metric 214. The first term on the right side of the equation represents the probability of a user (U), at a measured metric value of M, performing a transaction (T) given that the user is exposed to the paywall 118 at the current paywall metric. Similarly, the second term on the right side of the equation represents the probability of the user (U) not performing a transaction (NT) given the same conditions. If the metric value of the discriminatory metric 214 (M) being considered is $V_M$, the current paywall metric is $M_C$, and the value of the current paywall metric is $V_C$, the equation can be re-written as:

$$O(M, V_M) = P(U \in T | M = V_M, M_C = V_C) - P(U \in NT | M = V_M, M_C = V_C)$$

In this example, the results are restricted to metrics for which there is a greater probability that the user performed a transaction than did not perform a transaction. Accordingly, metrics are excluded from the resulting ranking unless the following condition is satisfied:

$$P(U \in T | M = V_M, M_C = V_C) > \tfrac{1}{2}$$

The metric selection module 206 may receive the probabilities used in the above equations from another source (e.g. probability testing module 204, another source via the network 108, and so forth), or perform the calculations directly. In either case, empirical methods may be employed to calculate the probabilities. For example:

$$P(U \in T | M = V_M, M_C = V_C) =$$
$$\frac{P(U \in T | M = V_M, M_C = V_C)}{P(M = V_M, M_C = V_C)} = \frac{\#(U \in T | M = V_M, M_C = V_C)}{\#(M = V_M, M_C = V_C)} \text{ and:}$$
$$P(U \in NT | M = V_M, M_C = V_C) =$$
$$\frac{P(U \in NT | M = V_M, M_C = V_C)}{P(M = V_M, M_C = V_C)} = \frac{\#(U \in NT | M = V_M, M_C = V_C)}{\#(M = V_M, M_C = V_C)}$$

The metric selection module 206 then ranks the probabilities from largest to smallest. The metric value of the particular discriminatory metric 214 for which the difference is largest (i.e., the metric for which the objective function $O(M)$ is maximized) is determined to be the candidate metric 216 in this example.

The metric selection module 206 outputs the candidate metric 216, along with information about the propensity of users to perform transactions with the paywall 118 at the candidate metric 216, to the transaction management module 116. The transaction module 116 uses the information to determine whether the candidate metric 216 is usable to control subsequent exposure of the paywall 118 to users of the digital content provided by service provider system 102. To do so, the transaction management module 116 determines whether the propensity of users to perform the transaction at the candidate metric 216 is greater than a propensity of users to perform the transaction at the current paywall metric. For example, the transaction management module 116 may receive the propensity of users to perform the transaction at the current paywall metric from another source (e.g., the probability testing module 204, the metric selection module 206, another source via the network 108, and so forth) and compare that propensity with the propensity information corresponding to the candidate metric 216.

If the transaction management module 116 determines that the propensity of users to perform the transaction at the candidate metric 216 is greater than the propensity of users to perform the transaction at the current paywall metric, the transaction management module 116 can control subsequent exposure of the paywall by replacing the current paywall metric with the candidate metric 216. In that case, exposure of the user interface of the paywall during subsequent interactions of users with the service provider system 102 is initiated when users reach the threshold interaction defined by the candidate metric 216. Otherwise, the transaction management module 116 does not replace the current paywall metric.

In at least one implementation, the metric selection module 206 also transmits all of the discriminatory metrics 214, along with information about the propensity of users to perform transactions with the paywall 118 at each discriminatory metric 214, to the service provider system 102. The service provider system 102 may use the information about the discriminatory metrics 214 to manage the digital content it provides. For example, the discriminatory metrics 214 may indicate that users viewing digital content in the evening are more likely to perform a transaction than users viewing the digital content in the morning or that users viewing during weekdays are more likely to perform a transaction than users viewing on a weekend. This information may help the service provider system 102 make decisions about when to present some digital content for viewing. In another example, the discriminatory metrics 214 may indicate that users that view digital content with mobile devices do not perform transactions more or less often than users that view the digital content on desktop devices. This information may help the service provider system 102 determine whether to make different digital content available to mobile users and non-mobile users.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
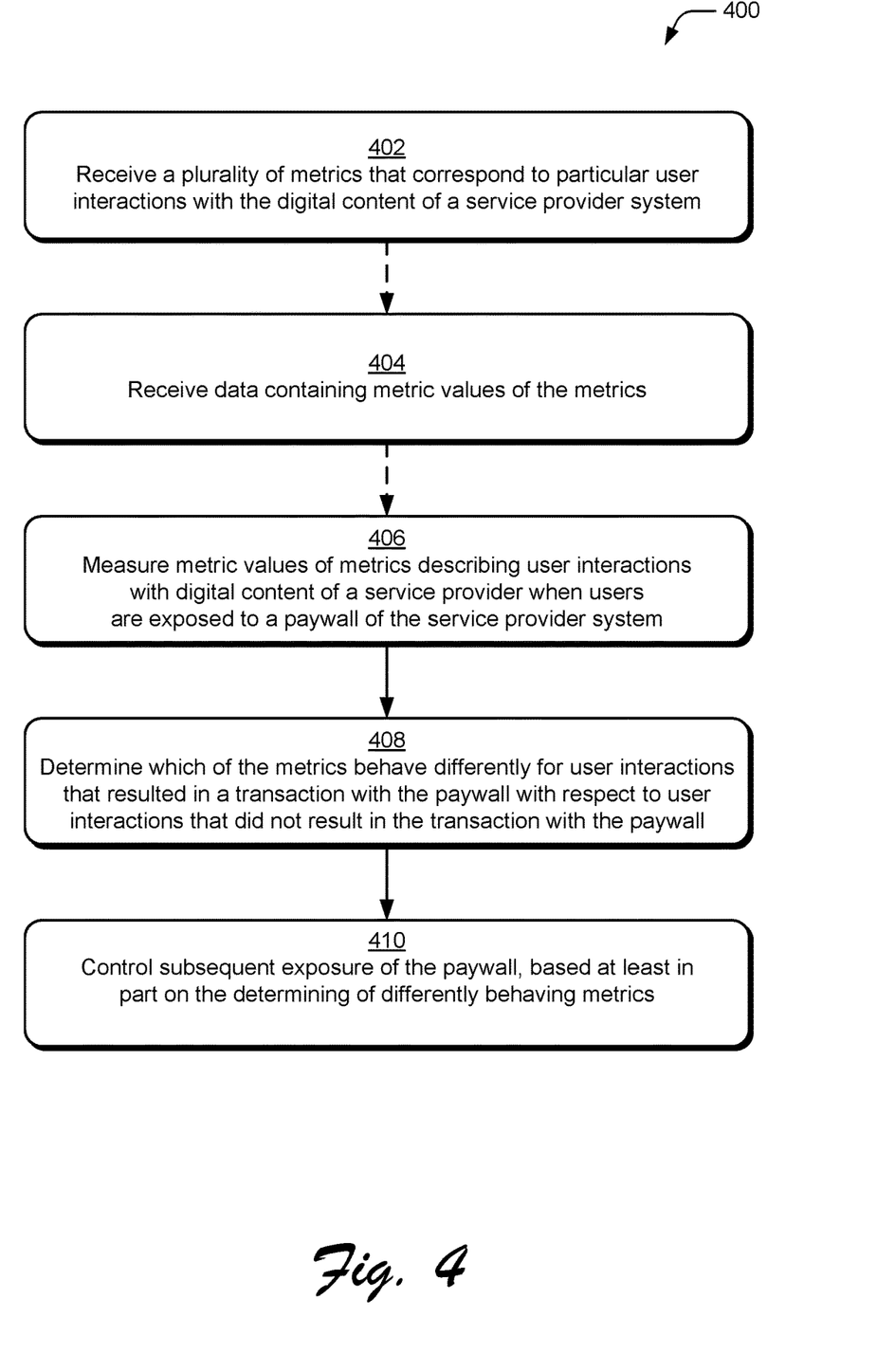
FIG. 4 is a flow diagram depicting a procedure in an example implementation in which paywall metric techniques are employed to control exposure of a paywall.

FIG. 4 depicts a procedure 400 in an example implementation in which paywall metric techniques are employed to control exposure of a paywall. A plurality of metrics that correspond to particular user interactions with digital content of a service provider system (e.g., the service provider system 102 of FIG. 1) are received (block 402). The metrics, for example, may include a time of day the interaction occurred, a time duration of the interaction, a day of the week the interaction occurred, a referral source that directed the user to the digital content of the interaction, a device type on which the interaction occurred, an amount of digital content with which the interaction occurred, a genre of the digital content with which the interaction occurred, a number of times the user interacted with the environment in a time period, and so forth. The plurality of metrics may be received via a network (e.g., network 108 as described in FIG. 1) or from another source.

Data is received containing metric values of the plurality of metrics (block 404). The metric values of the metrics describe the amount of user interaction, corresponding to the particular metric, with the digital content of a service provider system. The data may be received via a network (e.g., network 108) or from another source.

Metric values of the metrics that describe user interactions are measured (block 406). The metric values may be measured, for example, by the paywall analysis module 120 at a point when the user is exposed to a paywall of the service provider system 102. The paywall may include a user interface that is presented to users upon reaching a threshold amount of interaction with the digital content of the service provider system. The user interface restricts access to the digital content unless users perform the transaction.

Metrics that behave differently are determined (block 408). The difference in behavior is a difference between user interactions that result in a transaction with the paywall, with respect to user interactions that do not result in the transaction with the paywall. The statistical analysis module 126, for instance, may use the measured metric values of the metrics (e.g., interaction data 122) to determine discriminatory metrics 214 (i.e., metrics for which there is an increased propensity for a user to perform a transaction with the paywall 118, with respect to the current paywall metric).

Subsequent exposure of the paywall is controlled, based at least in part on the determination of metrics that behave differently (block 410). The subsequent exposure is a part of subsequent user interaction with the digital content of the service provider system. For example, the metric selection module 206 may analyze the discriminatory metrics 214 to create a candidate metric 216 for which the increased propensity of a user to perform a transaction with the paywall 118 is greatest. The candidate metric can be used to control subsequent exposure of the paywall 118.

Figure 5:
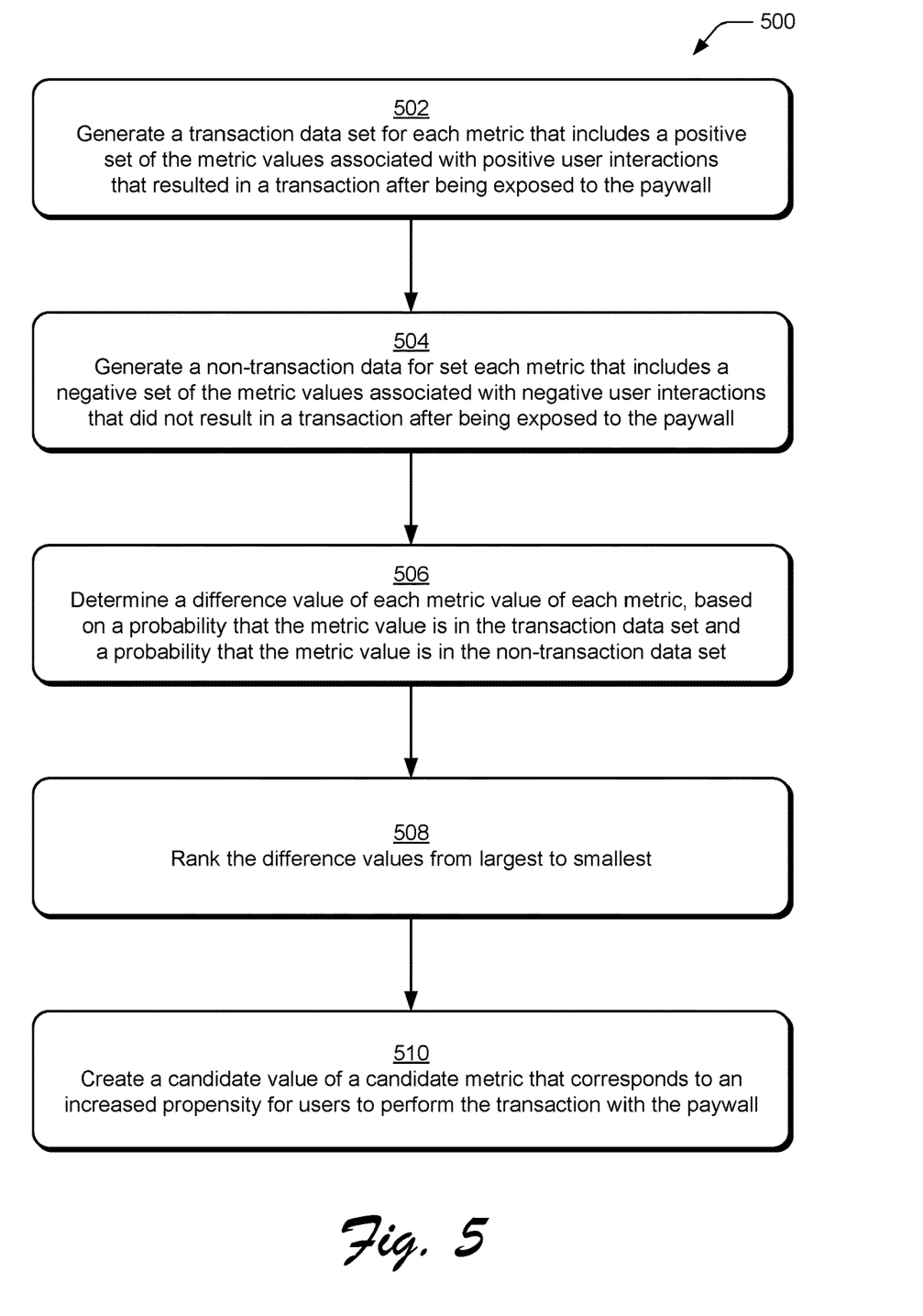
FIG. 5 is a flow diagram depicting a procedure in an example implementation in which candidate paywall metrics are determined.

FIG. 5 depicts another procedure 500 in an example implementation in which the metrics that behave differently are determined. A transaction data set is generated for each metric (block 502). The transaction data sets include a positive set of the measured metric values associated with positive user interactions that resulted in a transaction after the paywall was exposed to a computing device of the user.

A non-transaction data set is generated for each metric (block 504). The non-transaction data sets include a negative set of the measured metric values associated with negative user interactions that did not result in a transaction after the paywall was exposed to the user. The data module 202, for example, may generate a transaction data set 208 and a non-transaction data set 210 for each metric.

A difference value is determined between a probability that a metric value is in the transaction data set and a probability that the metric value is in the non-transaction data set (block 506). The determination of the probability difference value for each metric may be made by applying a statistical algorithm. The probability testing module 204, for example, may be used to apply the statistical algorithm to the metric values to determine the discriminatory metrics 214. In at least one case, the statistical algorithm is a uni-variate test that is effective to determine differences between probability distributions of data sets (e.g., a test that determines a Kolmogorov-Smirnov statistic). In some cases, the statistical algorithm employs a significance level of 0.01 to determine that that a metric behaves differently. The significance level represents a probability that the statistical algorithm will falsely determine that the metric behaves differently.

The difference values between the probability that the metric value is in the transaction data set and the probability that the metric value is in the non-transaction data set are ranked from largest to smallest for each metric value of each metric (block 508). Metric values for which the probability that the metric value is in the non-transaction data set is higher than the probability that the metric value is in the transaction data set are excluded from the ranking. The metric selection module 206, for instance, may rank the probability difference values of the discriminatory metrics 214.

A candidate value of a candidate metric is created, using the ranked difference values (block 510). The candidate value of the candidate metric is a metric that corresponds to an increased propensity for users to perform the transaction with the paywall. For example, the metric selection module 206 may be used to create the candidate metric 216 to use as the candidate value of the candidate metric. The candidate metric 216 is the metric and value that is determined to have the largest difference value between the probability of being in the transaction data set and the probability of being in the non-transaction data set.

In some cases, the transaction data set and the non-transaction data set may contain a different number of metric values. A difference in the number of metric values may be measured to determine a larger data set and a smaller data set. A threshold value of the difference may be set to initiate application of a balancing technique to the larger data set. For example, balancing technique 212 may be used to extract a representative subset from the larger data set (e.g., a subset that contains a number of metric values about equal to a number of metric values in the smaller data set). The representative subset can then be used in place of the larger data set. In another example, the representative subset can be extracted and used in place of the larger data set to perform the remainder of the process to create a candidate value of the candidate metric. The balancing technique repeats the extraction and replacement procedure a number of times (e.g., 100 times). The most common result produced by the repetitions is then used as the candidate value of the candidate metric.

Figure 6:
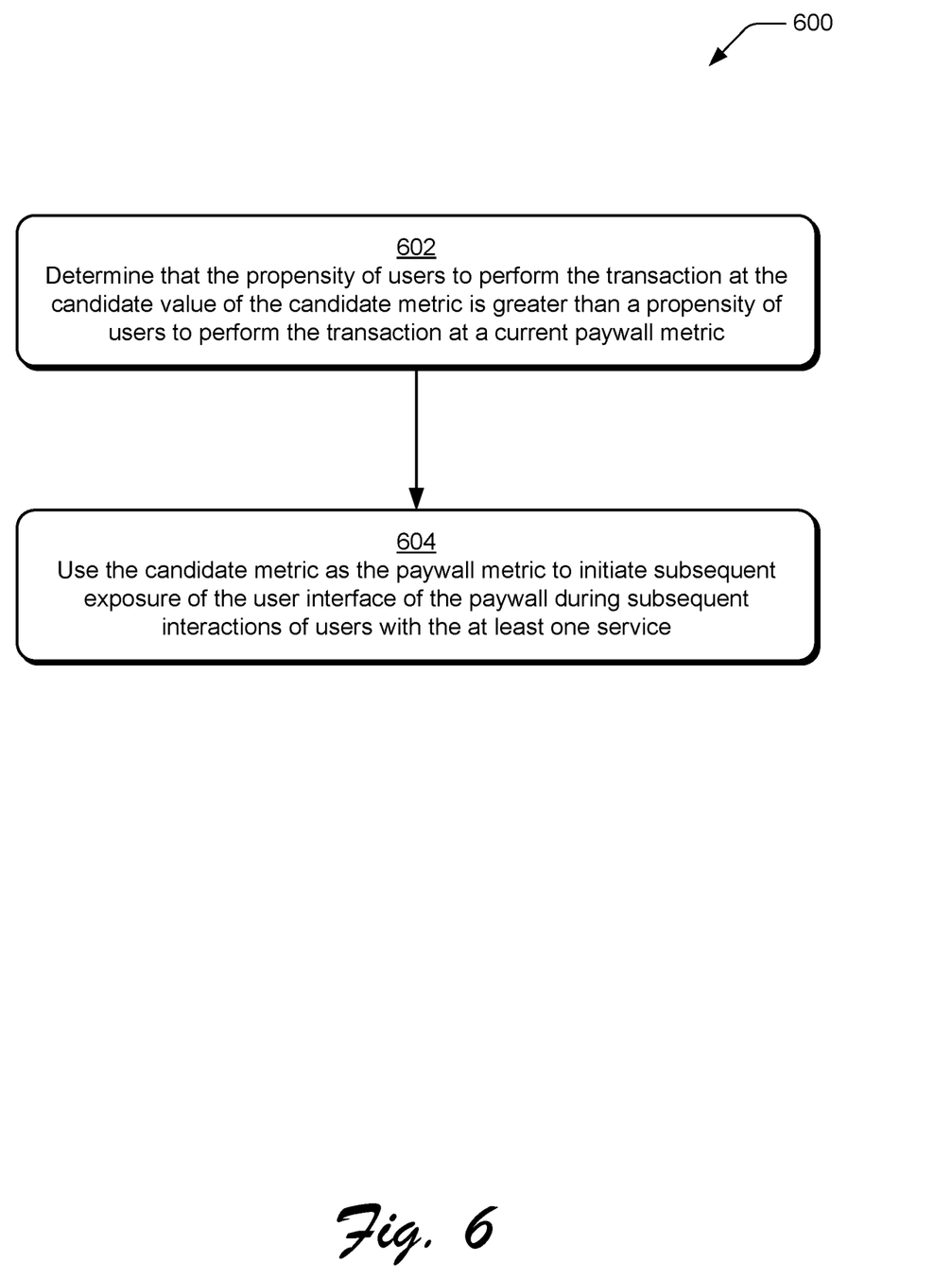
FIG. 6 is a flow diagram depicting a procedure in an example implementation in which subsequent exposure to a paywall is controlled with a candidate paywall metric.

FIG. 6 depicts another procedure 600 in an example implementation in which subsequent exposure of the paywall is controlled (block 602). The propensity of users to perform the transaction at the candidate value of the candidate metric is determined to be greater than a propensity of users to perform the transaction at a current value of a paywall metric. The transaction management module 116, for instance, may compare the propensities to determine whether the propensity of users to perform the transaction at the candidate metric 216 is greater than the propensity of users to perform the transaction at the current paywall metric. The current value of the paywall metric is an amount of interaction with the digital content of the service provider system that, when reached, initiates presentation of the paywall. The current value of the paywall metric is also the point at which the data used to create the candidate value of the candidate metric was collected.

The candidate value of the candidate metric is used as the paywall metric to initiate subsequent exposure of the user interface of the paywall during subsequent interactions of users with the digital content of the service provider system (block 604). For example, if the transaction management module 116 determines that the propensity of users to perform the transaction when exposed to the paywall at candidate metric 216 is greater than the propensity of users to perform the transaction when the paywall is exposed to the paywall at the current value of the paywall metric, the current paywall metric is replaced with candidate metric 216.

Figure 7:
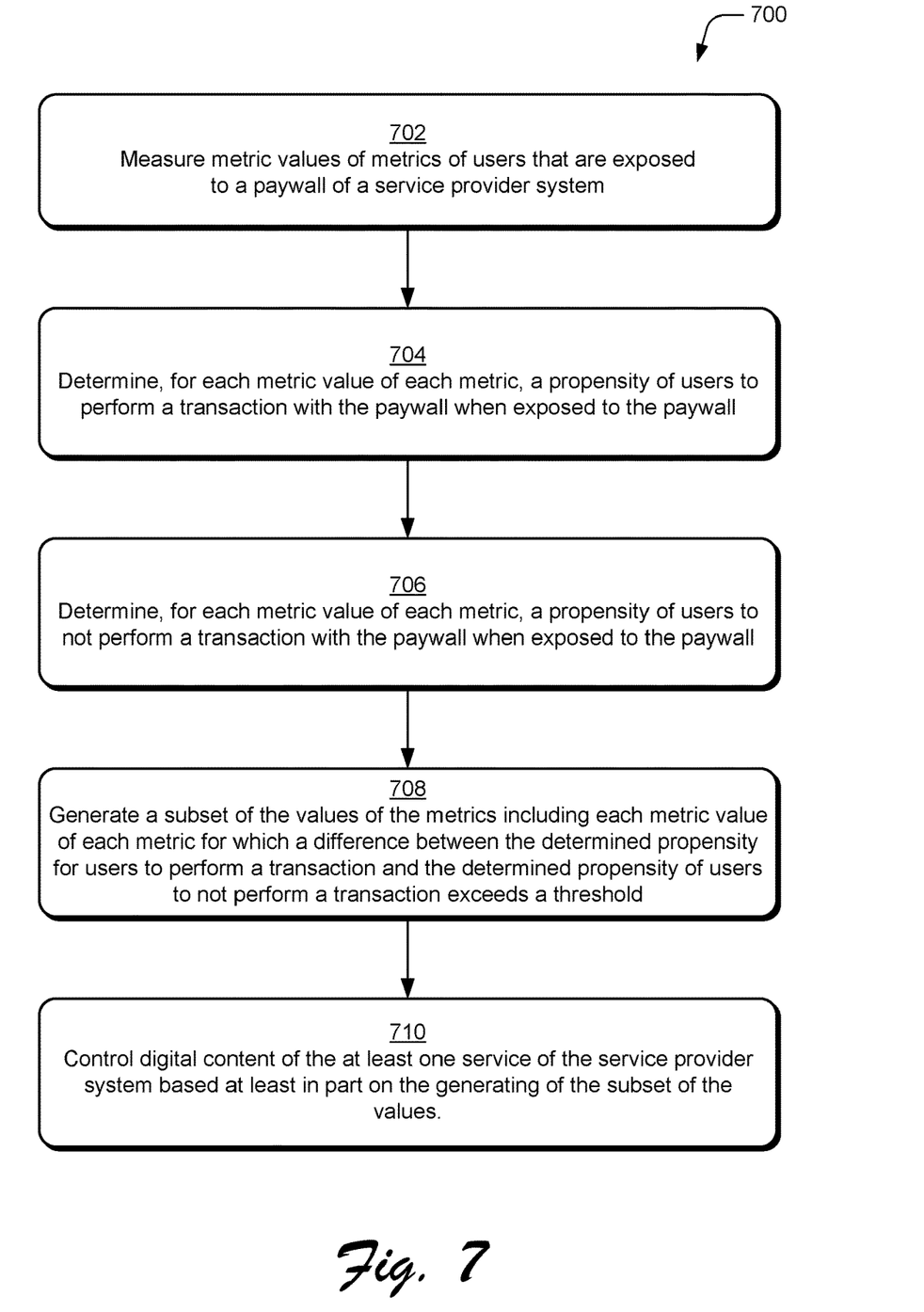
FIG. 7 is a flow diagram depicting a procedure in an example implementation in which a subset of paywall metrics is generated.

FIG. 7 depicts another procedure 700 in an example implementation in which a subset of metrics is generated which indicated an increased propensity for users to perform a transaction with a paywall of a service provider system. Metric values are measured values of metrics that correspond to particular user interactions with digital content of a service provider system (block 702). The paywall analysis module 120, for example, may be used to measure the metric values of metrics at a point where the user is exposed to the paywall.

A propensity of users to perform a transaction with the paywall is determined for each metric value of each metric (block 704). The statistical analysis module 126, for instance may determine the propensity of users to perform a transaction with the paywall A propensity of users to not perform a transaction with the paywall is determined for each metric value of each metric (block 706). The statistical analysis module 126, for instance may determine the propensity of users to not perform a transaction with the paywall A subset of the metric values of the metrics is generated (block 708). The subset includes each metric value of each metric for which a difference between the determined propensity of users to perform a transaction with the paywall and the determined propensity of users to not perform a transaction with the paywall exceeds a threshold. The statistical analysis module 126, for instance, may use the interaction data 122 to determine discriminatory metrics 214. In one case, the subset that is generated may be a subset that includes all of the discriminatory metrics 214. In another case, the discriminatory metrics 214 may be further filtered to include only the discriminatory metrics 214 for which the differences exceed a threshold.

Digital content may then be controlled using the discriminatory metrics 214 (block 710). For example, the service provider system 102 may use the information provided by the discriminatory metrics 214 to manage the digital content it provides. As described above, the discriminatory metrics 214 may indicate that users are more or less likely to perform a transaction at different times of day or on different days of the week. This information may help the service provider system 102 make decisions about when to present some digital content for viewing. In another example, the discriminatory metrics 214 may indicate that the type of device on which users view digital content (e.g., mobile devices, desktop devices, and so forth) does not affect transaction propensity. This information may help the service provider system 102 determine whether to make different digital content available to mobile users and non-mobile users.

Example System and Device

Figure 8:
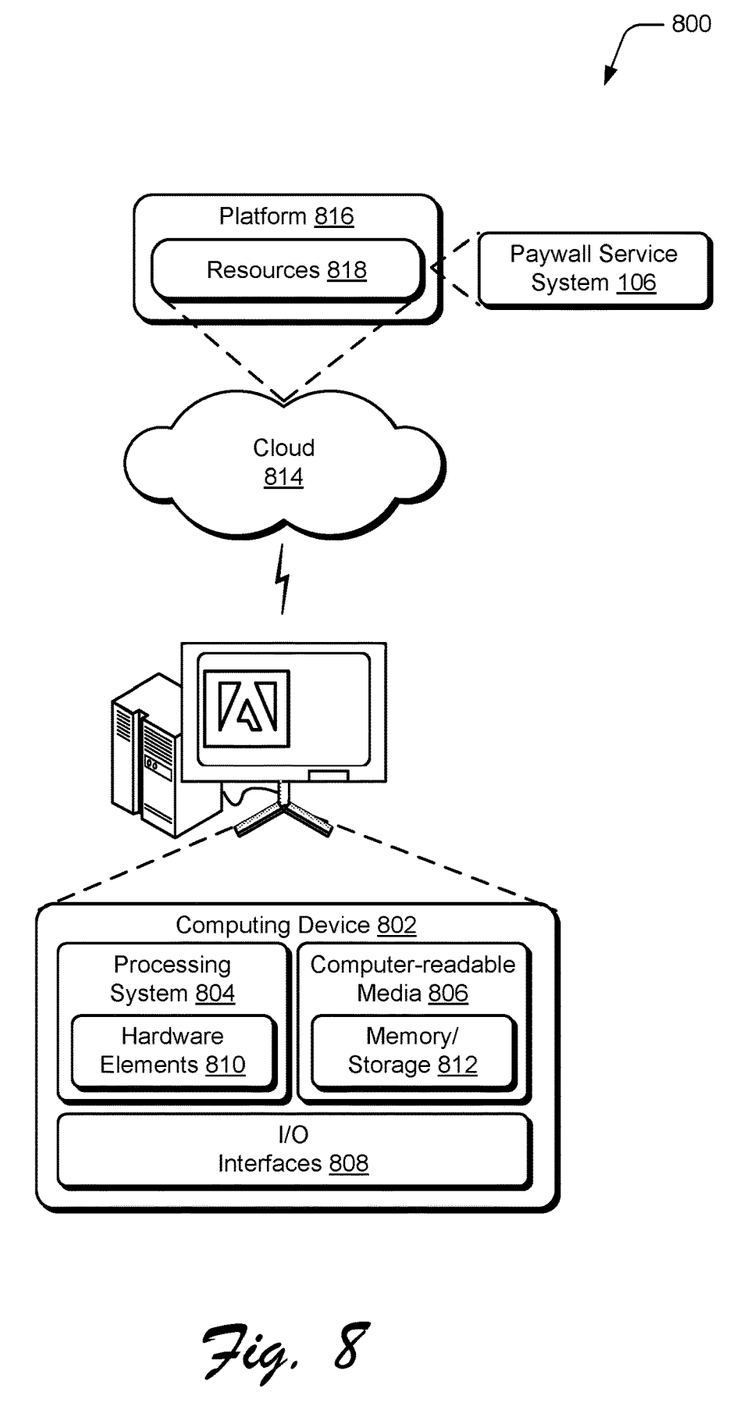
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the paywall service system 106. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a computing device, the method comprising:
    testing, by the computing device, metric values of metrics by using the metric values of the metrics to present a user interface associated with a service of a service provider system, the metrics describing types of user interactions with the service via a network;
    determining, by the computing device, difference values between first probability distributions of the metric values of the metrics for a first type of user response to a presentation of the user interface and second probability distributions of the metric values of the metrics for a second type of user response to the presentation of the user interface;
    determining, by the computing device, a subset of the difference values that exceed a threshold value of a difference between a probability of the first type of user response to the presentation of the user interface and a probability of the second type of user response to the presentation of the user interface;
    generating, by the computing device, a candidate value of a candidate metric based on the subset of the difference values, the candidate value of the candidate metric corresponding to an increased propensity of the first type of user response; and
    controlling, by the computing device, subsequent exposure of the user interface based at least in part on the candidate value of the candidate metric.

2. The method as described in claim 1, wherein the user interface is a paywall.

3. The method as described in claim 1, wherein the first type of user response to the presentation of the user interface includes a transaction and the second type of user response to the presentation of the user interface does not include a transaction.

4. The method as described in claim 1, wherein the user interface restricts access to the service unless a transaction is performed.

5. The method as described in claim 1, wherein the difference values are determined by applying a statistical algorithm utilizing a predefined significance level.

6. The method as described in claim 5, wherein the statistical algorithm is a univariate test.

7. The method as described in claim 5, wherein the statistical algorithm determines a Kolmogorov-Smirnov Statistic.

8. The method as described in claim 1, further comprising replacing a user interface metric with the candidate metric.

9. A system comprising:
    a processing system; and
    a computer-readable storage medium having instructions stored thereon that, responsive to execution by the processing system, causes the processing system to perform operations including:
        testing metric values of metrics by using the metric values of the metrics to present a user interface associated with a service of a service provider system, the metrics describing types of user interactions with the service via a network;
        determining first probability distributions of the metric values of the metrics for a first type of user response to a presentation of the user interface and second probability distributions of the metric values of the metrics for a second type of user response to the presentation of the user interface;
        determining difference values between the first and second probability distributions of the metric values of the metrics that exceed a threshold value of a difference between a probability of the first type of user response and a probability of the second type of user response;

generating a candidate value of a candidate metric based on the difference values, the candidate value of the candidate metric corresponding to an increased propensity of the first type of user response; and controlling subsequent exposure of the user interface based at least in part on the candidate value of the candidate metric.

10. The system as described in claim 9, wherein the user interface is a paywall.

11. The system as described in claim 9, wherein the first type of user response to the presentation of the user interface includes a transaction and the second type of user response to the presentation of the user interface does not include a transaction.

12. The system as described in claim 9, wherein the user interface restricts access to the service unless a transaction is performed.

13. The system as described in claim 9, the operations further comprising replacing a user interface metric with the candidate metric.

14. The system as described in claim 9, wherein the difference values are determined by applying a statistical algorithm utilizing a predefined significance level.

15. The system as described in claim 14, wherein the statistical algorithm is a univariate test.

16. The system as described in claim 14, wherein the statistical algorithm determines a Kolmogorov-Smirnov Statistic.

17. One or more computer-readable storage media comprising instructions stored thereon that, responsive to execution by a computing device in a digital medium environment, cause operations of the computing device including:

testing metric values of metrics by using the metric values of the metrics to present a user interface associated with a service of a service provider system, the metrics describing types of user interactions with the service via a network;

determining difference values between first probability distributions of the metric values of the metrics for a first type of user response to a presentation of the user interface and second probability distributions of the metric values of the metrics for a second type of user response to the presentation of the user interface;

determining a subset of the difference values that exceed a threshold value of a difference between a probability of the first type of user response to the presentation in the user interface and a probability of the second type of user response to the presentation in the user interface;

generating a candidate value of a candidate metric based on a largest difference value of the subset of the difference values, the candidate value of the candidate metric corresponding to an increased propensity of the first type of user response; and controlling subsequent exposure of the user interface based at least in part on the candidate value of the candidate metric.

18. The one or more computer-readable storage media as described in claim 17, wherein the user interface is a paywall.

19. The one or more computer-readable storage media as described in claim 17, wherein the first type of user response to the presentation of the user interface includes a transaction and the second type of user response to the presentation of the user interface does not include a transaction.

20. The one or more computer-readable storage media as described in claim 17, wherein the user interface restricts access to the service unless a transaction is performed.

* * * * *